(12) United States Patent
Krüger (10) Patent No.: US 7,958,676 B2
(45) Date of Patent: Jun. 14, 2011

(54) DEFLECTION DEVICE FOR AN ADJUSTMENT DEVICE OF A MOTOR VEHICLE

(75) Inventor: Harald Krüger, Erlangen (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 784 days.

(21) Appl. No.: 11/516,170

(22) Filed: Sep. 5, 2006

(65) Prior Publication Data

US 2007/0069547 A1    Mar. 29, 2007

(30) Foreign Application Priority Data

Sep. 12, 2005  (DE) .................. 10 2005 044 113

(51) Int. Cl.
  *E05F 11/48*  (2006.01)
(52) U.S. Cl. ........................................ 49/352
(58) Field of Classification Search ............ 49/348, 49/349, 352, 502; 403/326, 329; 292/597.1, 292/599, 599.4
See application file for complete search history.

(56) References Cited

U.S. PATENT DOCUMENTS

| | | | | |
|---|---|---|---|---|
| 3,346,208 | A | * | 10/1967 | Hoffman et al. ............ 242/597.3 |
| 3,482,794 | A | * | 12/1969 | Beardsley ................. 242/597.3 |
| 3,857,526 | A | * | 12/1974 | Dischert ................... 242/573.9 |
| 4,063,689 | A | * | 12/1977 | Brovelli .................... 242/571.6 |
| 5,074,077 | A | * | 12/1991 | Toyoshima et al. ............. 49/352 |
| 5,333,411 | A | * | 8/1994 | Tschirschwitz et al. ......... 49/352 |
| 5,370,339 | A | * | 12/1994 | Moody et al. .............. 242/597.6 |
| 5,657,580 | A | * | 8/1997 | Kobrehel ..................... 49/352 |
| 5,683,058 | A | * | 11/1997 | Schwarz et al. ............ 242/578.2 |
| 5,778,600 | A | * | 7/1998 | Chu ........................... 49/352 |
| 6,151,833 | A | * | 11/2000 | Gmurowski et al. ............. 49/352 |
| 6,328,246 | B1 | * | 12/2001 | Hjort et al. ................ 242/422.5 |
| 6,553,718 | B2 | * | 4/2003 | Arquevaux et al. ............. 49/352 |
| 6,571,515 | B1 | * | 6/2003 | Samways et al. ............... 49/502 |
| 6,584,731 | B2 | * | 7/2003 | Arquevaux et al. ............. 49/352 |
| 6,758,013 | B2 | * | 7/2004 | Staser et al. ................. 49/352 |
| 7,104,009 | B2 | * | 9/2006 | Ishii et al. .................. 49/375 |
| 7,121,498 | B1 | * | 10/2006 | Black ...................... 242/588.2 |
| 2005/0011130 | A1 | | 1/2005 | Klippert et al. |
| 2006/0174542 | A1 | * | 8/2006 | Bernard et al. ................ 49/352 |

FOREIGN PATENT DOCUMENTS

DE      101 51 068 A1    4/2003

* cited by examiner

*Primary Examiner* — Jerry Redman
(74) *Attorney, Agent, or Firm* — Christie, Parker & Hale, LLP

(57) ABSTRACT

A deflection device includes a support, at least one deflection element which is arranged on the support, a receptacle which is integrally formed on the support and protrudes from the support for the deflection element, an undercut which is formed on the receptacle and an elastic element which is integrally formed on the support or the deflection element and acts on the deflection element in such a manner that the deflection element tends to engage in the undercut of the receptacle. The deflection device is configured for an adjustment device of a motor vehicle for the deflection of an elongate, flexible traction means which can be moved along a direction of extent by means of an adjustment drive and to which a motor vehicle part which is to be adjusted with the adjustment device can be connected.

35 Claims, 6 Drawing Sheets

DEFLECTION DEVICE FOR AN ADJUSTMENT DEVICE OF A MOTOR VEHICLE

CROSS-REFERENCE TO A RELATED APPLICATION

This application claims priority to and the benefit of German Patent Application Number 10 2005 044113.0, filed on Sep. 12, 2005, which are hereby incorporated by reference.

BACKGROUND

The invention relates to a deflection device for an adjustment device of a motor vehicle, for example for a motor vehicle window lifter or for a locking system of a motor vehicle.

A deflection device of this type serves for the deflection of an elongate, flexible traction means which can be moved along its direction of extent by means of an adjustment drive of the adjustment device and to which a motor vehicle part which is to be adjusted with the adjustment device, for example an adjustable window pane or a lock part, can be connected or is connected. The elongate, flexible traction means, for example in the form of a rope or cable, can be operatively connected for this purpose to an associated adjustment drive in such a manner that the adjustment drive, for example in the form of a motor drive, drives a rotatably mounted rope drum which is looped around by the flexible traction means, so that, during operation of the adjustment drive, the flexible traction means executes—as a function of the direction of rotation of the rope drum—a longitudinal movement in a first direction or in a second direction, which is opposite thereto, along its direction of extent.

By, for example, a window pane of a motor vehicle, as the motor vehicle part to be adjusted, being connected to a traction means of this type, which can be moved along its direction of extent by means of an adjustment drive, the window pane, during operation of the adjustment drive, can be adjusted along the direction of movement of that section of the flexible traction means to which the window pane which is to be adjusted is fixed. In order in this case to be able to move the window pane along a predetermined adjustment direction, for example in order to raise or lower a window pane into a window-pane opening or from a window-pane opening, the driver is fixed to an adjustment section of the flexible traction means that extends in the adjustment direction of the window pane to be adjusted and, in the case of a longitudinal movement along its direction of extent, thereby brings about a movement of the driver together with the window pane, which is arranged thereon, along the desired adjustment direction.

A deflection device of the type mentioned at the beginning, which is provided for such a deflection of the flexible traction means, comprises a support on which at least one deflection element is arranged, by means of which the flexible traction means is deflected in such a manner that it extends with an adjustment section, which starts from the deflection element, in the adjustment direction of the motor vehicle part to be adjusted, so that, in the case of a longitudinal movement of the flexible traction means, a driver which is fixed to this adjustment section is moved along the adjustment direction and, in the process, carries along a motor vehicle part which is connected to the driver and is to be adjusted. The support on which the at least one deflection element is arranged may be, for example, a guide rail which is elongate in the adjustment direction of a window pane to be adjusted and on which the driver supporting the window pane is guided in a longitudinally displaceable manner, or another supporting part of a motor vehicle door, such as, for example, an assembly support on which a plurality of functional components of a motor vehicle door, such as, for example, components of a window lifter, of a lock subassembly, a speaker, a side airbag module and the like, can be preassembled and which can be fitted together with the components preassembled thereon into a motor vehicle door where it forms part of the inside door skin, for example.

A window lifter with a deflection device of the type mentioned at the beginning is known, for example, from DE 101 51 068 A1.

SUMMARY

The invention is based on the problem of further improving a deflection device of the type mentioned at the beginning, in particular with regard to a simple construction and simple mountability of the deflection device.

According to the invention, a receptacle is integrally formed on the support of the deflection device, which receptacle protrudes from the support, is intended for the deflection element and on which, in turn (integrally) an undercut is formed in which the deflection element engages in such a manner that it is held on the receptacle; furthermore, an elastic element is integrally formed on the support (i.e. directly on the support or on the receptacle provided on the support) and/or on the deflection element, which elastic element acts on the deflection element (in particular is clamped between the support and the deflection element) and with which the deflection element is elastically prestressed in such a manner that the deflection element tends to engage in the undercut of the receptacle. In this case, an integrally formed elastic element is particularly preferably provided at least on the support or on the receptacle thereof.

The solution according to the invention has the advantage that a respective deflection element, which serves for the deflection of the flexible traction means so that an adjustment section of the flexible traction means extends in the adjustment direction of the motor vehicle part to be adjusted, is held by a receptacle which is integrally formed on a support which is present in any case, such as, for example, an assembly support of a motor vehicle door or a guide rail of a window lifter. The provision of the receptacle, on which the at least one deflection element of the deflection device is held, therefore does not require any additional separate subassemblies; on the contrary, the receptacle required for this forms an integrally formed part of a support which is present in any case. Furthermore, no additional, separate components are required either in order to ensure that the respective deflection element actually engages in the undercut of the associated receptacle and is thereby held in the receptacle. This is ensured, rather, by the at least one elastic element which is formed integrally with the receptacle or the deflection element and acts under prestress on the deflection element in such a manner that the latter remains permanently in engagement with the undercut of the receptacle.

According to a preferred embodiment of the invention, the deflection element is of annular design in cross section and engages annularly around the associated receptacle, for example with the deflection-element inner wall which is circular in cross section. The reduction of the deflection element to an essentially annular element, on the outer surface of which the flexible traction means which is to be deflected is guided, creates the possibility of designing the associated receptacle, which is engaged around by the deflection element, to be of a correspondingly large size, namely in such a manner that the receptacle essentially fills the space engaged around by the deflection element. This permits a correspondingly stable design of the receptacle, with the result that the latter, even if it is composed of plastic, can absorb even relatively large forces which occur on the flexible traction means during operation of an adjustment device.

For this purpose, the receptacle preferably has an outer wall which encircles it annularly and which is engaged around by the deflection element which is of annular configuration. In this case, according to an embodiment, the receptacle itself may also be of essentially annular configuration. As an alternative, however, it may also be provided that the receptacle is designed as a solid body, i.e. does not have an inner wall encircling it annularly.

The undercut integrally formed on the receptacle is preferably designed in such a manner that the receptacle engages in the region of its undercut over the deflection element, for example by the undercut being formed by a channel which extends along a segment of a circle and in which the deflection element engages. For this purpose, the deflection element is preferably curved on its inner wall in the direction of the receptacle.

Furthermore, the undercut is formed on the receptacle in a spatial respect preferably in such a manner that the forces acting on the flexible traction means in the case of a longitudinal movement of the flexible traction means (during operation of the associated adjustment drive) tend to press or pull the deflection element into the undercut. For this purpose, the deflection element can be formed in a region of the receptacle that faces away from the adjustment section of the flexible traction means.

The prestress which the elastic element exerts on the deflection element preferably also acts along the abovementioned direction. This firstly ensures that the deflection element can be held securely on the associated receptacle even during installation of the adjustment device, for example a window lifter, i.e. before corresponding holding forces are exerted on the deflection element by the traction means. Furthermore, the deflection element is securely held on the receptacle even if the traction means, for example because of the presence of slack in the rope, do not exert sufficient holding forces on the deflection element. For this purpose, the at least one elastic element acts on the deflection element along a direction which runs perpendicularly to the longitudinal axis engaged around by the annular deflection element, in particular in the radial direction, so that the deflection element is moved under the effect of that prestress into the undercut on the receptacle.

Furthermore, it can be provided that the elastic element is designed as a positive engagement element, in particular as a clip, which engages with an end section over a section of the deflection element, for example over the curvature which protrudes inwards from the inner wall of the deflection element. By this means, the elastic element together with the undercut additionally contributes to securing the deflection element in the axial direction.

So that, when the respective deflection element is placed onto the associated receptacle, the elastic element which is integrally formed on the respective receptacle can be adequately deformed, a cutout into which the elastic element can be deformed is preferably provided on the receptacle.

According to an advantageous development of the invention, a plurality of elastic elements are arranged on the receptacle and each act on the deflection element in order to hold the latter on the receptacle. Said elastic elements can be arranged one behind another, for example, along the circumferential direction of an annular outer wall of the receptacle.

If the elastic element is arranged on the deflection element or protrudes from the latter, the deflection element advantageously engages with the elastic element in the undercut on the support and, for this purpose, is preferably designed such that it runs along a ring or a ring section (i.e. part of a complete ring).

In order to form an adjustment section of the flexible traction means that extends in the adjustment direction of the motor vehicle part to be adjusted with the adjustment device, and on which the driver supporting the motor vehicle part to be adjusted is fixed, two deflection elements are generally provided which, spaced apart from each other along the adjustment direction, are arranged in the manner according to the invention on a respective receptacle which is integrally formed on the support and protrudes from the support.

At least one deflection device configured according to the invention can be used in a motor vehicle window lifter for adjusting a window pane.

BRIEF DESCRIPTION OF THE DRAWINGS

Further details and advantages of the invention will become clear in the description below of an exemplary embodiment with reference to the figures, in which.

DETAILED DESCRIPTION

Figure 5:
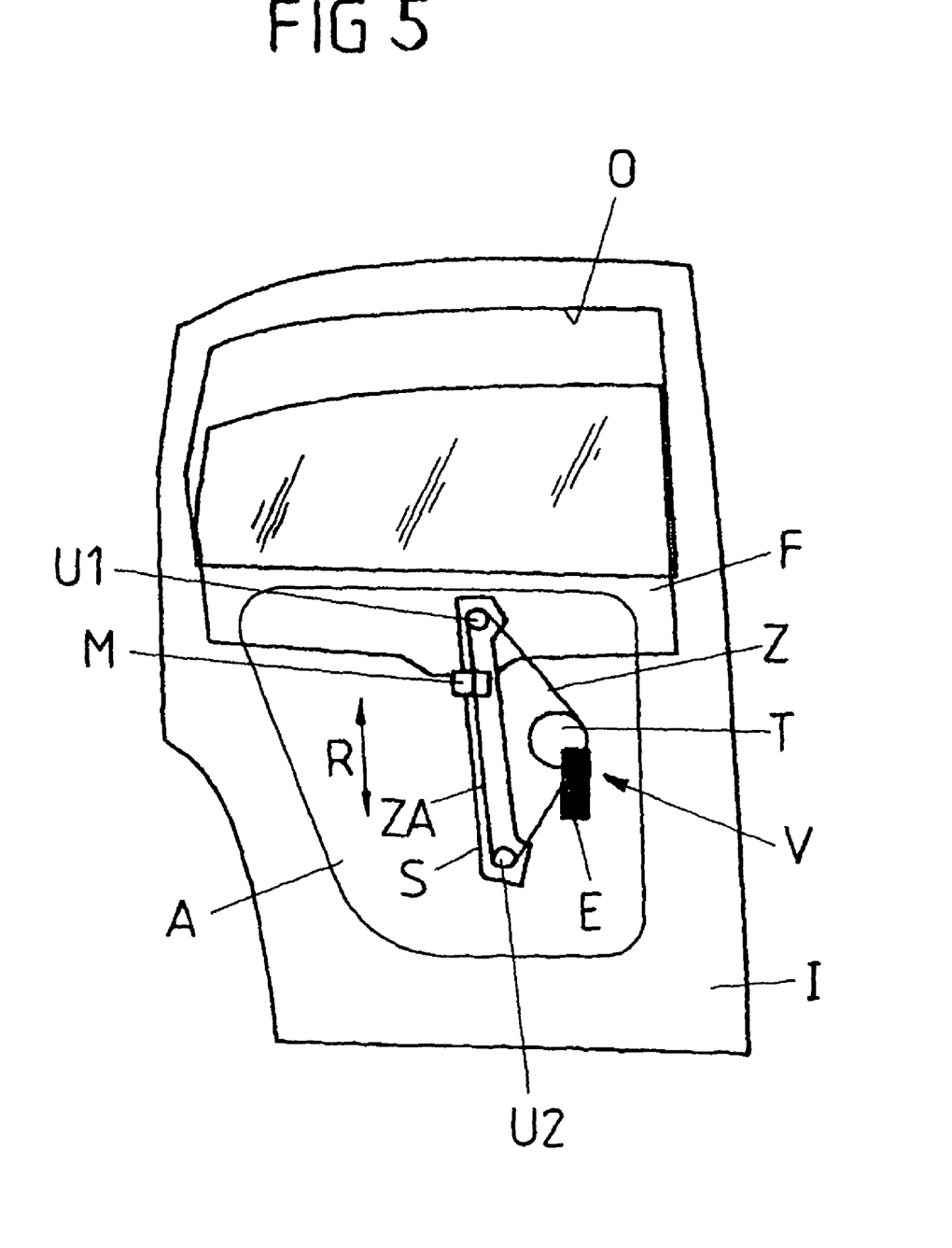
FIG. 5 shows a diagrammatic illustration of a motor vehicle window lifter with a deflection device comprising two deflection elements.

FIG. 5 schematically illustrates a motor vehicle window lifter which is arranged on an assembly support A and serves to raise and lower a window pane F along an adjustment direction R in order to raise the window pane F so as to close an associated window pane opening O (bounded, for example, by a window frame of a motor vehicle door) and in order to be able to lower it in order to open up the window pane opening O. The assembly support A is a door module carrier which is composed of plastic and on which different components of a motor vehicle door, such as, for example, the window lifter illustrated in FIG. 5, and furthermore a lock subassembly, a speaker, an airbag module and the like, can be preassembled and which can be fitted together with the components mounted thereon into a motor vehicle door where it forms part of the inside door skin I of the motor vehicle door.

The window lifter arranged on the assembly support A comprises an adjustment drive V with a driving motor E, for example in the form of an electric motor, and with a rope drum T which can be driven by the driving motor E via a suitable adjustment mechanism and can be rotated along the one or other direction about its axis by means of the driving motor E. The rope drum T is looped around by an elongate, flexible traction means Z in the form of a rope which, upon rotation of the rope drum T, moves in one of two mutually opposite directions along its longitudinal extent, the direction of movement of the traction means Z depending on the direction of rotation of the rope drum T. The traction means Z is deflected by means of two deflection elements U1, U2, which are spaced apart from each other in the adjustment direction R of the window pane F to be adjusted, in such a manner that an adjustment section ZA of the flexible traction means Z that is situated between the two deflection elements U1, U2 extends in the adjustment direction R of the window pane F to be adjusted. A driver M is fixed to the adjustment section ZA of the flexible traction means Z in a known manner and, upon a rotation movement of the rope drum T during operation of the driving motor E, is raised or lowered—depending in each case on the direction of rotation of the rope drum T—along the adjustment direction R of the window pane F to be adjusted. In the process, the driver M carries along the window pane F which is to be adjusted and which is connected in the region of its lower edge in a suitable manner, for example by means of clamping jaws, by means of a fastening element reaching through a window pane hole, by adhesive bonding or the like, to the driver M and is supported by the latter.

The driver M here is guided on a guide rail F which extends in the adjustment direction R and which can firstly be a subassembly which is separate from the assembly support A and is fastened thereto or, alternatively, can be a subassembly which is integrally formed on the assembly support A. If the window pane F to be adjusted is guided with its two lateral window pane edges in lateral window pane guides of the corresponding motor vehicle door in a defined manner, the guide rail S may also be entirely omitted and the driver M may be moved freely over the assembly support A.

As a result, a driving torque produced during operation of the driving motor E is transmitted via the rope drum T and the flexible traction means Z looping around the latter and the drive M fixed to the flexible traction means Z to the window pane F to be adjusted which is then raised or lowered along the adjustment direction R as a function of the direction of rotation of the rope drum T.

The two deflection elements U1, U2, by means of which the flexible traction means Z is deflected in such a manner that it extends with an adjustment section ZA in the adjustment direction R of the window pane F to be adjusted, can be arranged, for example, at one end in each case of the guide rail S extending in the adjustment direction R. If the guide rail S is integrally formed on the assembly support A, this corresponds at the same time to an arrangement on the assembly support A. Alternatively, one or both of the deflection elements U1, U2 may also be arranged on the assembly support A outside the guide rail S. The only factor of importance is for the corresponding motor vehicle door to have, for the respective deflection element U1 or U2, a support on which the deflection element is arranged.

An exemplary embodiment of a preferred arrangement of a deflection element directly on an assembly support A is illustrated below with reference to FIGS. 1 to 3B. The deflection element, which is only referred to schematically by the designation U1 or U2 in FIG. 5, is referred to in FIGS. 1 to 3B by the designation 3.

Figure 1:
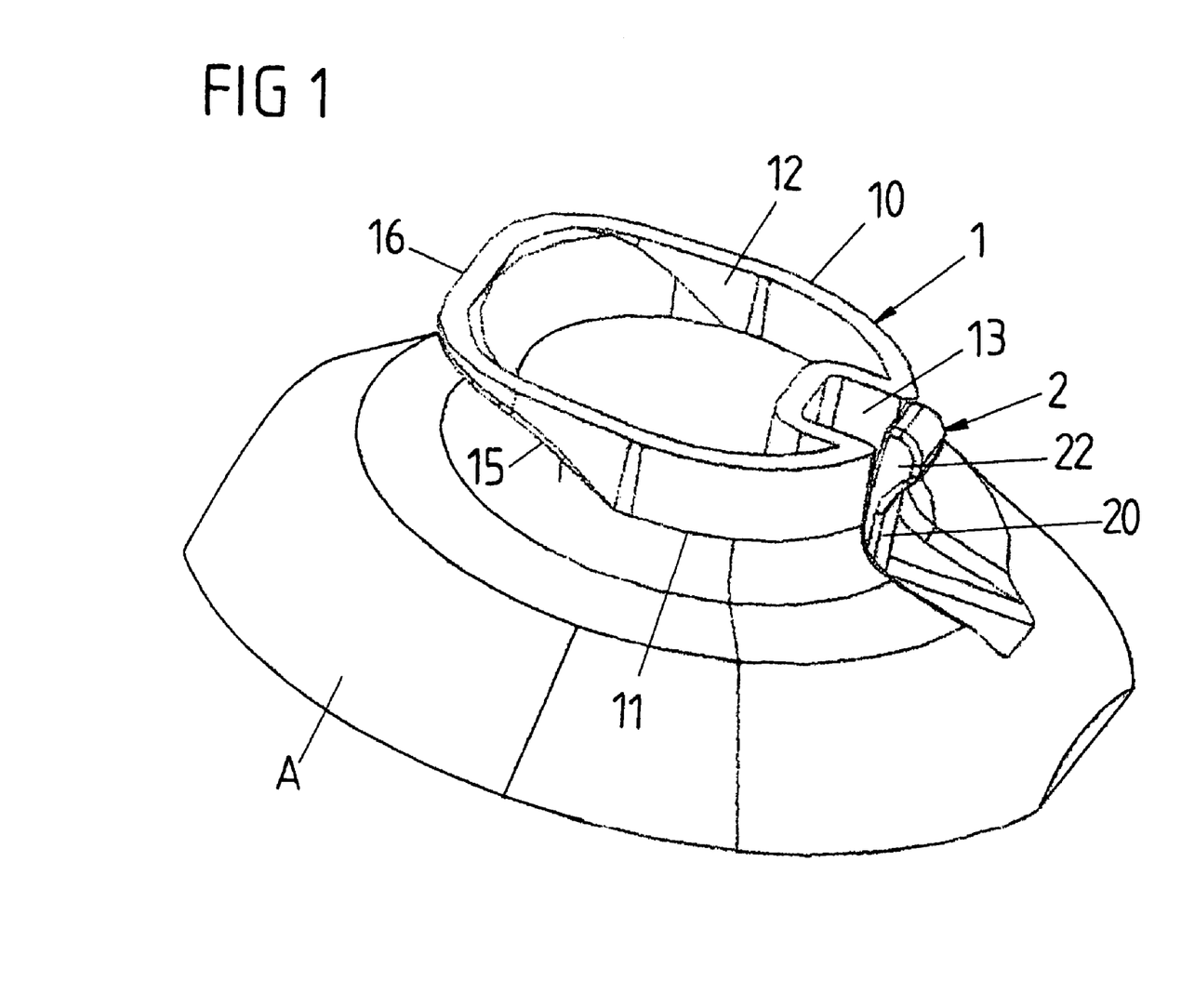
FIG. 1 shows a perspective illustration of a receptacle integrally formed on a support, for a deflection element of a motor vehicle window lifter.

FIG. 1 has a receptacle 1 which is integrally formed on the assembly support A, which is preferably composed of plastic, for a deflection element, with a basic body 10 which protrudes from the assembly support A, encircles the receptacle annularly (not necessarily in closed form) and has an outer wall 11 and an inner wall 12.

An undercut 15 is formed in the annularly encircling outer wall 11 of the receptacle 1, which undercut is formed by a channel which extends semicircularly in cross section along a segment of a circle. This undercut 15 serves to secure a deflection element 3, compare FIGS. 3A and 3B, which engages in the undercut 15 and, in the process, is engaged over by an upper edge 16 of the annular basic body 10 of the receptacle 1.

Furthermore, an elastic element 2 in the form of a hook-shaped clip is integrally formed on the support A in the region of the receptacle 1 (lying opposite the undercut 15), which clip has a connecting section 20 protruding from the assembly support A and a widened head 22, which adjoins the connecting section and forms a free end of the clip 2. Behind the elastic element 2, a depression or indentation 13 is formed in the annular basic body 10 of the receptacle 1, into which the elastic element 2 can be deformed if, according to FIGS. 2A and 2B, a deflection element 3 is placed onto the receptacle 1.

Figure 2A:
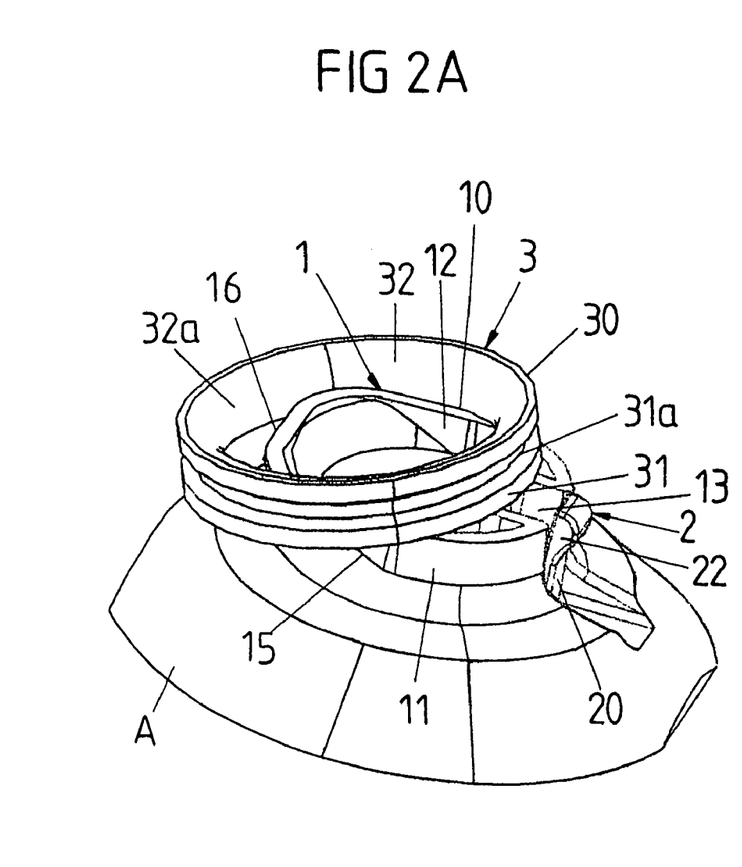
FIG. 2A shows the receptacle from FIG. 1 at the beginning of the placing of a deflection element onto the receptacle.
Figure 2B:
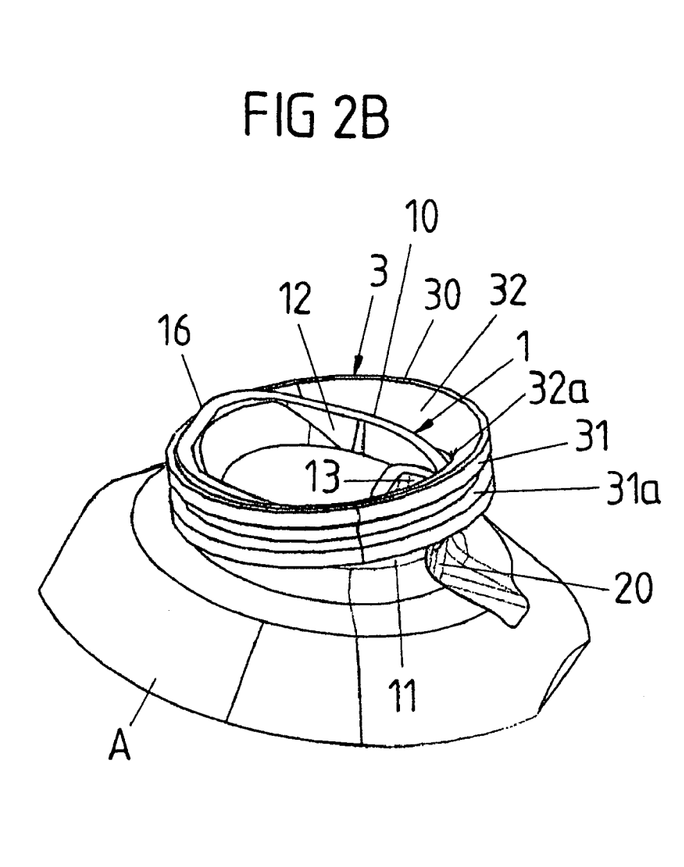
FIG. 2B shows the receptacle from FIG. 1 at the end of the placing of a deflection element onto the receptacle.

The deflection element 3 to be placed onto the receptacle 1 is of annular design, as can be seen with reference to FIGS. 2A and 2B. The basic body 30 of the deflection element 3, which is circular-ring-shaped in cross section, has an outer wall 31 with a guide groove 31a for flexible traction means, and also an inner wall 32 with a curvature 32a directed inwards, i.e. in the direction of the receptacle 1.

The deflection element 3 in the form of a rope pulley is placed onto the receptacle 1 in such a manner that a section of the deflection element 3 is fitted into the undercut 15 formed on the receptacle 1, another, opposite section of the deflection element 3 acting on the elastic element 2 and deforming the latter into the depression 13, provided for it, on the receptacle 1.

Figure 3A:
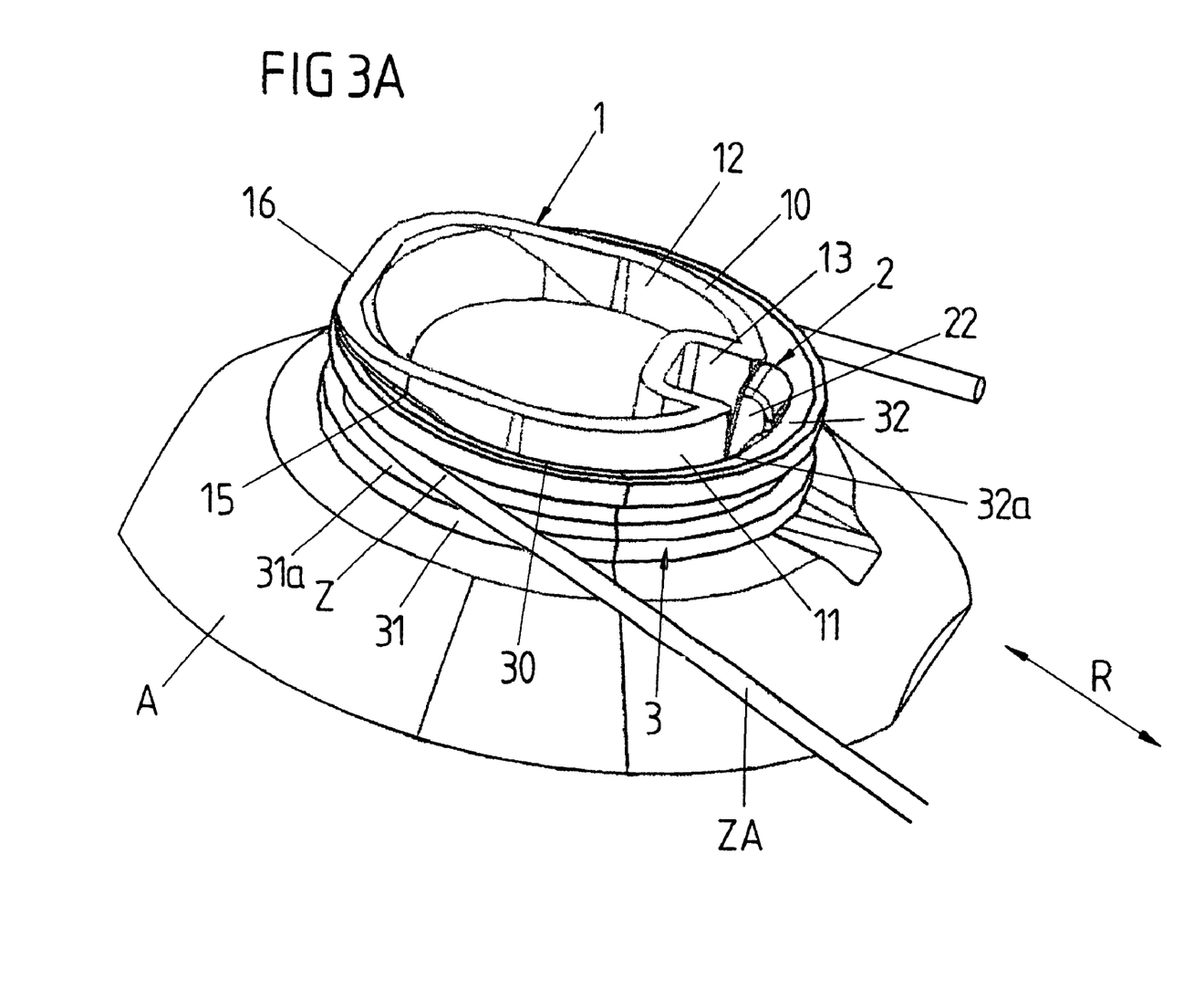
FIG. 3A shows the receptacle from FIG. 1 after a deflection element is placed on it.
Figure 3B:
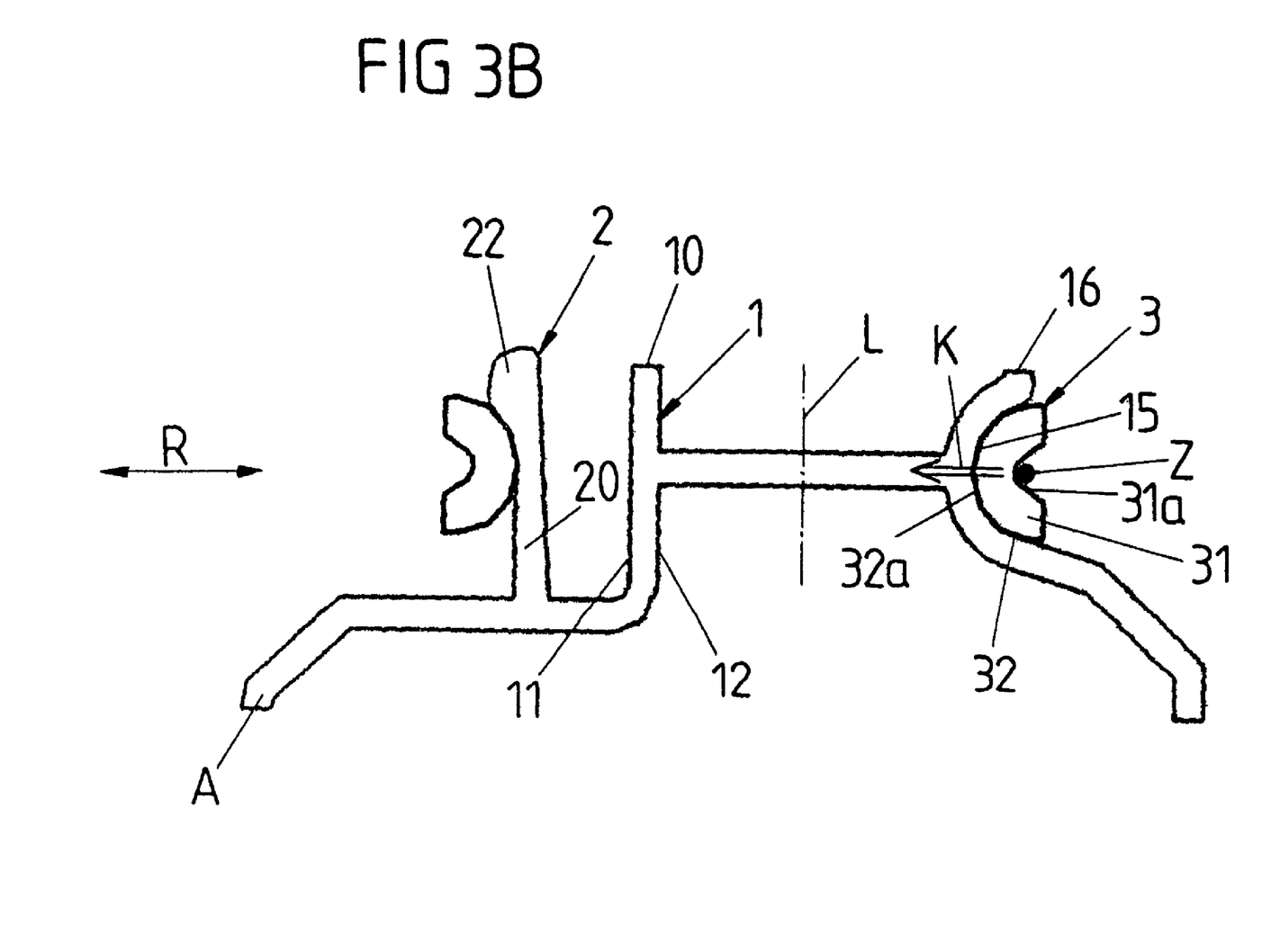
FIG. 3B shows a cross section through the arrangement from FIG. 3A.

After the deflection element 3 is placed in the form of a rope pulley onto the receptacle 1, or, more precisely, onto the annular basic body 10 thereof, the deflection element 3 surrounds the receptacle 1 along the outer wall 11 thereof and also engages here around a longitudinal axis L of the receptacle 1, which axis runs axially with respect to the deflection element 3, which is circular-ring-shaped in cross section. Furthermore, the deflection element 3 engages with a section in the undercut 15 of the receptacle 1 and is engaged over in the region of the undercut 15 by the upper edge 16 of the receptacle 1 and is thereby held in the axial direction (along the longitudinal axis L, perpendicular to the adjustment direction R). Specifically, the receptacle 1 engages in the region of the undercut 15 over the inwardly directed curvature 32a of the inner wall 32 of the deflection element 3.

The undercut 15 is formed on the receptacle 1 in such a manner that it faces away from the adjustment section ZA of the flexible traction means Z, i.e. it lies in that region of the receptacle 1 in which the deflection element 3, which is held on the receptacle 1, is engaged around by the flexible traction means Z, i.e. the flexible traction means Z is guided in the corresponding rope groove 31a in the outer wall 31 of the deflection element 3. By this means, rope forces which act on the flexible traction means Z (and which act on the deflection element 3 via that subsection of the flexible traction means Z which is guided in the rope groove 31a) tend to press the deflection element 3 into the undercut 15.

Furthermore, it can be seen with reference to FIGS. 3a and 3b that the elastic element 2 is arranged in the form of a clip lying opposite the undercut 15 of the receptacle 1 in such a manner that the forces (acting in the adjustment direction R) exerted by the elastic element 2 (which is under prestress) on a section, which bears against it, of the deflection element 3 tend to hold the deflection element 3 in the undercut 15 of the receptacle 1.

In addition, the elastic element 2 in the form of a clip engages with its widened head 22 over the deflection element 3 in the region of the inner curvature 32a thereof and thereby also contributes to the axial securing of the deflection element 3.

As a result, the respective deflection element 3, which is formed by a rope pulley, is held in a simple manner on a receptacle 1 which is integrally formed on a support A and on which the deflection element 3 can be arranged by being placed onto it, said deflection element engaging in an undercut 15 of the receptacle 1 and being held in the undercut 15 by an elastic element 2 in the form of a clip. All of the components of the receptacle 1 including the undercut 15 and the elastic element 2 are integrally formed on the support A, so that no additional, separate subassemblies for securing the deflection element 3 are required on the support A. The placing of the deflection element 3 onto the associated receptacle 1 can also be carried out in a simple manner by the deflection element being placed onto the associated receptacle 1, with the elastic element 2 being deformed, and, in the process, being fitted into the undercut 15 of said receptacle. Subsequently, the elastic prestress of the elastic element 2 ensures that the deflection element 3 engages in the undercut 15 of the receptacle 1.

Owing to the fact that the deflection element 3 is formed in the form of a rope pulley in a simple manner by means of an annular basic body 30 which is circular in cross section, the associated receptacle 1 can be formed to be correspondingly large in size, since the entire interior of the annular basic body 30, which interior is surrounded by the deflection element 3, is available for this. This permits in particular a connection of the receptacle 1 to the support A over a large area, so that correspondingly large forces acting on the traction means Z and therefore on the respective deflection element 3 can be introduced into the support A via the receptacle I without the receptacle 1 being damaged and therefore its holding effect for the deflection element 3 being impaired.

Figure 4:
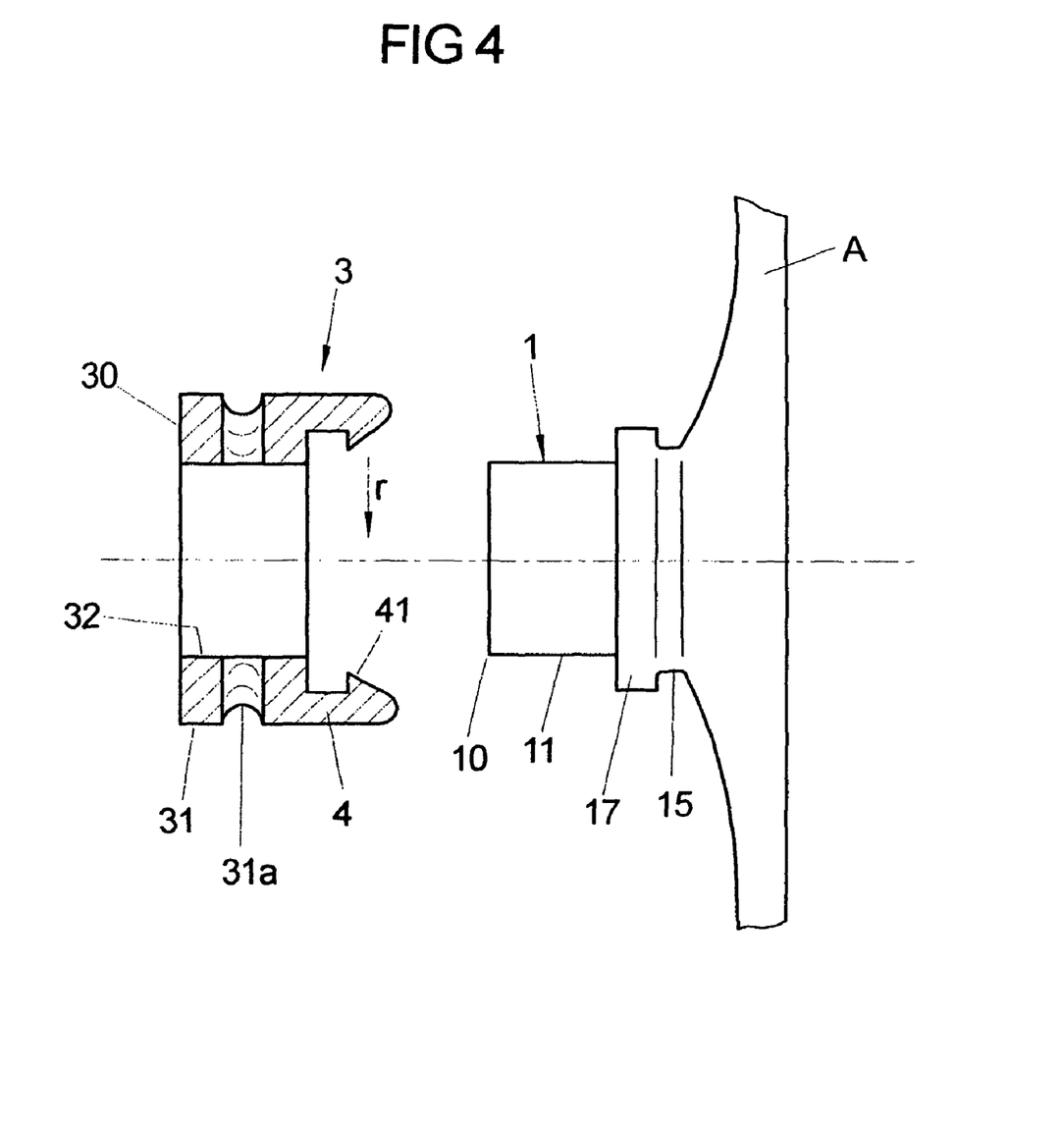
FIG. 4 shows a modification of the exemplary embodiment from FIGS. 1 to 3B.

FIG. 4 shows a modification of the exemplary embodiment from FIGS. 1 to 3B, to be precise, in the respect that, in the present case, the elastic element 4, which serves to clamp the deflection element 3 in the undercut 15 provided on the support A or on the receptacle 1, is integrally formed on the deflection element 3.

According to FIG. 4, a receptacle 1 protrudes from the support A by means of an annularly encircling basic body 10 which, on its outer wall 11, has a projection 17 which extends in the manner of a ring, as a result of which an undercut 15 in the form of a channel extending annularly is formed between the projection 17 and the support A.

The associated deflection element 3 is designed—as in the case of the exemplary embodiment from FIGS. 1 to 3B—as a sleeve which can be placed under the receptacle 1, cannot be rotated in the placed-on state and has a basic body 30 which is annular in cross section.

The basic body 30 of the deflection element 3 has, on its outer wall 31, a guide groove 31a for a flexible traction means. Since the deflection element 3 is to be mounted on the receptacle 1 in a nonrotatable manner (i.e. essentially in a rotationally fixed manner), the basic body 30 of the deflection element 3 is to be composed, at least in the region of the guide groove 31a of a sufficiently slideable material, so that a flexible traction means in the form of a rope or cable can slide smoothly in the guide groove 31a. For this purpose, the basic body 30 of the deflection element 3 is composed, for example, of a suitable plastic or of steel.

From the basic body 30 of the deflection element 3, which is to be placed with its annularly encircling inner wall 32 onto the receptacle 1 on the support, there protrudes axially a resilient clip, which is integrally formed on it, encircles it annularly (and is preferably composed of plastic), as the elastic element 4 which has, at its free end facing away from the basic body 30, a head 41 which is hook-shaped in cross section. When the deflection element 3 is placed onto the receptacle 1 on the support side, the clip which serves as the elastic element 4 latches with its hook-shaped head 41 into the undercut 15 on the support. In the process, the resilient clip, which is configured as the elastic element 4, is prestressed inwards in the radial direction r in such a manner that it exerts a force in the radial direction r on the receptacle 1 in the region of the undercut 15. By this means, mutually opposite regions of the hook-shaped head 41 of the elastic element 4 in the form of a clip mutually press on another into the undercut 15.

The invention clamed is:

1. Deflection device for an adjustment device of a motor vehicle for the deflection of an elongate, flexible traction device which can be moved along a direction of extent with an adjustment drive of the adjustment device and to which a motor vehicle part which is to be adjusted with the adjustment device can be connected, the deflection device comprising:
    a support;
    at least one deflection element arranged on the support and configured to deflect the flexible traction device in such a manner that the flexible traction device extends with an adjustment section in an adjustment direction of the motor vehicle part to be adjusted;
    a receptacle for the deflection element integrally formed on the support and protruding from the support, the receptacle comprising an outer wall which annularly encircles the receptacle in at least one section of the receptacle, wherein the deflection element engages around the outer wall in the at least one section;
    an undercut formed on the receptacle and configured to engage the deflection element to hold the deflection element on the receptacle; and
    an elastic element integrally formed on one of the support and the deflection element and configured between the support and the deflection element in such a manner that the deflection element tends to engage in the undercut of the receptacle.

2. Deflection device according to claim 1, wherein the receptacle is annular in cross section.

3. Deflection device according to claim 1, wherein the receptacle engages over the deflection element in the region of the undercut.

4. Deflection device according to claim 1, wherein the undercut is formed by a channel which is formed on the receptacle and in which the deflection element engages.

5. Deflection device according to claim 4, wherein the channel forming the undercut extends in cross section along a ring section.

6. Deflection device according to claim 1, wherein the undercut is arranged on the receptacle in such a manner that forces acting on the flexible traction device tend to press the deflection element into the undercut.

7. Deflection device according to claim 1, wherein the undercut is formed in a region of the receptacle that faces away from the adjustment section of the flexible traction device.

8. Deflection device according to claim 1, wherein a prestress of the elastic element acts on the deflection element along a direction which has at least one component along the adjustment direction.

9. Deflection device according to claim 8, wherein the prestress of the elastic element acts on the deflection element along a direction which coincides with the adjustment direction.

10. Deflection device according to claim 1, wherein the deflection element engages annularly around a longitudinal axis, and wherein the elastic element prestresses the deflection element outwards along a direction transverse to the longitudinal axis.

11. Deflection device according to claim 10, wherein the elastic element prestresses the deflection element outwards in the radial direction.

12. Deflection device according to claim 1, wherein the elastic element engages over a section of the deflection element.

13. Deflection device according to claim 12, wherein the elastic element engages over an inwardly directed curvature of an inner wall of the deflection element.

14. Deflection device according to claim 12, wherein the elastic element has a widened head to engage over the section of the deflection element.

15. Deflection device according to claim 1, wherein the elastic element is designed as an elastic clip.

16. Deflection device according to claim 1, wherein the receptacle has an indentation into which the elastic element can be deformed.

17. Deflection device according to claim 1, wherein the elastic element protrudes from the support.

18. Deflection device according to claim 1, wherein the elastic element protrudes from the deflection element.

19. Deflection device according to claim 18, wherein the deflection element engages with the elastic element in the undercut.

20. Deflection device according to claim 18, wherein the elastic element encircles the deflection element at least along a ring section.

21. Deflection device according to claim 1, further comprising a plurality of elastic elements, each elastic element configured to act on the deflection element to hold the deflection element on the receptacle.

22. Deflection device according to claim 21, wherein the elastic elements are arranged one behind another along the circumference of the receptacle.

23. Deflection device according to claim 1, comprising two deflection elements arranged on the support and spaced apart from each other along the adjustment direction, wherein each deflection element is arranged on a respective receptacle integrally formed on the support and protruding from the support.

24. Deflection device according to claim 1, wherein the motor vehicle part to be adjusted is an adjustable window pane and the associated adjustment device is a motor vehicle window lifter.

25. Deflection device according to claim 24, further comprising a driver for adjusting the window pane, the driver being fixed to the adjustment section of the flexible traction device, wherein the driver is moved in the adjustment direction with a longitudinal movement of the adjustment section of the flexible traction device, the driver is moved in the adjustment direction.

26. Deflection device according to claim 25, wherein the driver is configured for connection of the window pane to be adjusted, wherein the driver carries along the window pane to be adjusted in the adjustment direction with a longitudinal movement of the adjustment section of the flexible traction device.

27. Deflection device according to claim 25, wherein the support is formed by a guide rail on which the driver is guided moveably in the adjustment direction.

28. Deflection device according to claim 1, wherein the motor vehicle part to be adjusted is an adjustable lock part of a locking system and the associated adjustment device is an actuating device of the locking system.

29. Deflection device according to claim 1, wherein the support is composed of plastic.

30. Deflection device according to claim 1, wherein the support is designed as an assembly support of a motor vehicle door that is fitted together with functional components of a motor vehicle door mounted thereon into the motor vehicle door.

31. Deflection device for an adjustment device of a motor vehicle for the deflection of an elongate, flexible traction device which can be moved along a direction of extent with an adjustment drive of the adjustment device and to which a motor vehicle part which is to be adjusted with the adjustment device can be connected, the deflection device comprising:
    a support;
    at least one deflection element arranged on the support and configured to deflect the flexible traction device in such a manner that the flexible traction device extends with an adjustment section in an adjustment direction of the motor vehicle part to be adjusted;
    a receptacle for the deflection element integrally formed on the support and protruding from the support, the receptacle comprising an outer wall which annularly encircles the receptacle in at least one section of the receptacle, wherein the deflection element engages around the outer wall in the at least one section;
    an undercut formed on the receptacle and configured to engage the deflection element to hold the deflection element on the receptacle;
    an elastic element integrally formed on one of the support and the deflection element and configured between the support and the deflection element in such a manner that the deflection element tends to engage in the undercut of the receptacle; and
    wherein the entire deflection element is annular in cross section and engages annularly around the receptacle, and wherein the entire deflection element defines an annular outer surface configured to guide the flexible traction device.

32. Deflection device according to claim 31, wherein the deflection element has an inner wall which is annular in cross section and surrounds the receptacle.

33. Deflection device according to claim 32, wherein the inner wall of the deflection element is curved in the direction of the receptacle.

34. A motor vehicle window lifter for adjusting a window pane, the window lifter comprising:
    an adjustment drive for producing a driving torque;
    an elongate, flexible traction device coupled to the adjustment drive for movement along a direction of extent of the flexible traction device by the adjustment drive, and which adjusts the window pane; and
    a deflection device comprising:
        a support;
        at least one deflection element arranged on the support and configured to deflect the flexible traction device in such a manner that the flexible traction device extends with an adjustment section in an adjustment direction of the window pane;
        a receptacle for the deflection element integrally formed on the support and protruding from the support, the receptacle comprising an outer wall which annularly encircles the receptacle in at least one section of the receptacle, wherein the deflection element engages around the outer wall in the at least one section;

an undercut formed on the receptacle and configured to engage the deflection element to hold the deflection element on the receptacle; and an elastic element integrally formed on one of the support and the deflection element and configured between the support and the deflection element in such a manner that the deflection element tends to engage in the undercut of the receptacle.

35. Motor vehicle window lifter according to claim 34, wherein the adjustment drive is arranged on the support of the deflection device.

* * * * *